Sept. 22, 1964     R. D. MARX     3,149,642
PRODUCT VALVE FOR TRUCK TANKS AND THE LIKE
Original Filed Feb. 12, 1960
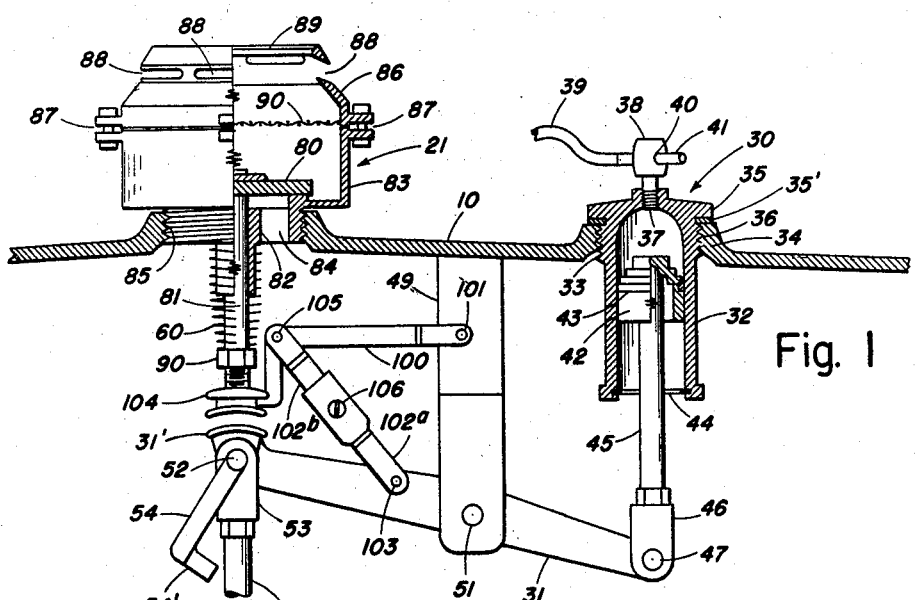
Fig. 1
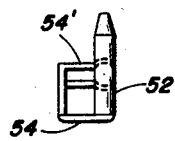
Fig. 2
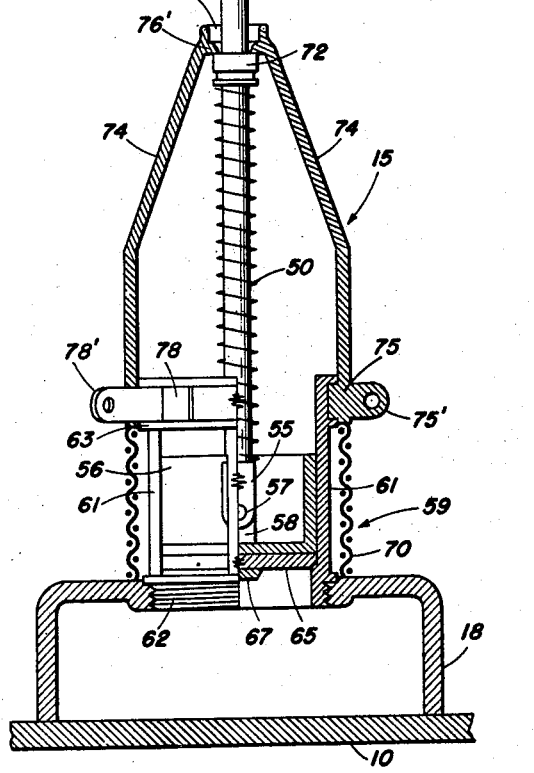
INVENTOR
Robert D. Marx
BY
Morgan, Finnegan, Durham & Pine
ATTORNEYS United States Patent Office 3,149,642
Patented Sept. 22, 1964

3,149,642
PRODUCT VALVE FOR TRUCK TANKS
AND THE LIKE
Robert D. Marx, Valley Stream, N.Y.
(952 Meeker Ave., Brooklyn, N.Y.)
Original application Feb. 12, 1960, Ser. No. 8,420, now Patent No. 3,115,894, dated Dec. 31, 1963. Divided and this application Apr. 25, 1963, Ser. No. 275,757
7 Claims. (Cl. 137—326)

This invention relates to product valves for truck tanks and the like for loading and dispensing the tank product.

This application is a division of applicant's prior copending application, Serial No. 8,420, filed February 12, 1960, for Fluid Transportation and Control Systems, now Patent No. 3,115,894, granted December 31, 1963.

Many truck tanks carry volatile fluids and employ elaborate valve and vent systems which sometimes malfunction. In known systems of the type wherein the product valve is located within the tank at the base thereof, a malfunction of the product valve requires for its removal and repair, the entry of a serviceman into the tank. If the tank is empty of the liquid product, it must in many cases be carefully purged of vapors before such entry. If the tank contains product, it must be unloaded and then purged before entry. If the product valve is operable to the open position the product can be unloaded according to regular procedures. If it is not so operable, other means must be adopted to unload the tank prior to purging and entry.

It may be seen that the foregoing known systems have significant disadvantages associated with the need for entry to the tank as a requisite to removal of the product valve. It is thus an object of this invention to eliminate such a need by providing an internal product valve for truck tanks and the like which, without sacrificing simplicity and efficient performance of the basic valve function, is s configured and arranged ts to be readily removable from outside the tank. The dangers and difficulties attending the servicing of known internal valves are thus eliminated.

A further object of the invention is to effect general improvements in internal product valves of truck tanks and the like as regards both their performance and maintenance.

The foregoing and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention provides in an exemplary arrangement, an internal product valve for a truck tank having means operable and accessible from outside the tank for disconnecting the valve from its actuator and from the tank wall.

The invention consists of the novel parts, constructions, arrangements, combinations and improvements herein shown and described.

Serving to illustrate an exemplary embodiment of the invention are the drawings herein of which:

FIGURE 1 is an elevation view partly in section of a tank venting and dispensing system embodying features of the invention; and FIGURE 2 is a detail view of a component of FIGURE 1.

As seen in the figures, the system according to the invention includes in a tank 10, a vent valve 21, an internal product valve 15 having a lift rod 22 and means for operating the lift rod comprising a pneumatic or hydraulic actuator 30 which positions rod 22 via a lever 31. The actuator 30 may comprise a device such as is disclosed in applicant's U.S. Patent No. 2,652,070 issued September 15, 1953. The actuator disclosed herein, which is substantially similar to the one in said patent, comprises a cylinder 32 with an external thread 33 which engages a tapped section 34 of shell 10. A flange 35 on the top of cylinder 32 is seated on a gasket 35' inserted between the flange and a shoulder 36 of tapped section 34.

Mounted in tapped hole 37 in the top of cylinder 32 is fitting 38 to which hydraulic line 39 is connected. This fitting also includes a bore 40 normally closed by a fusible plug 41 of low-melting-point alloy such as solder or Woods metal. This arrangement, by diverting hydraulic pressure from the actuator, insures automatic closure of the valves in case of fire. A spring 50, associated with the internal product valve 15, and a spring 60 in the vent valve assembly 21, insure closure of these two members when control pressure in actuator 30 is relieved.

During normal conditions, application of control pressure to actuator 30 causes a depression of a piston 42 slidably mounted in cylinder 32. An O ring 43 promotes proper sealing between the piston and cylinder and a lock ring 44 limits down travel of the piston.

Attached to piston 42 is piston rod 45. Threaded on the other end of the rod is yoke 46 the arms of which straddle one end of rocker arm 31 and are pivotably coupled thereto by clevis pin 47. Rocker arm 31 is pivoted by means of pin 51 on bracket 49, the latter being secured to shell 10. The other end of arm 31 is pivotably connected by a pin 52 to yoke 53 threaded on lift rod 22.

In applicant's aforementioned patent, the connection of the rocker arm to the lift rod was accomplished by means including a key-shaped pin which engaged a slot in the lift rod and a keyhole in the rocker arm, the rocker arm thereby being pivotably connected to the lift rod. The pin was equipped with a handle and in disassembling the arm and rod, the handle was rotated to that angle at which the keyed pin was aligned with the keyway in the arm. At this angle the pin could be removed from the arm and from the lift rod; at all other angles the pin was effectively locked in position.

While this arrangement has proved effective, it has the disadvantage of requiring the positioning of the handle to a precise angle in order to effect removal of the pin. To eliminate this requirement applicant has devised the arrangement illustrated in FIGURES 1 and 2 wherein pin 52, which is not keyed, is equipped with a transverse handle 54 having a U-shaped clamp 54' extending therefrom. The resilient fingers of the clamp 54' straddle lift rod 22 when handle 54 is depressed to its lowermost position thereby retaining pin 52 in position. For disassembly it is only necessary to pull handle 54 away from the rod 22 thereby disengaging clamp 54' and enabling removal of pin 52. This removal can be effected at any convenient angle of handle 54.

Connected to the lower end of lift 22 is a yoke 55 which is connected to piston 56 of the internal valve by a pin 57 which couples the yoke to the piston bolt 58. Piston 56 is slidably mounted in the cylindrical cage 59 which includes vertical piston guides 61 arranged in cylindrical fashion around the peripheries of a threaded base 62 and a collar 63. Base 62 is generally ring-shaped, the open central section having a bevelled edge which receives the seat 65 of piston 56. The seat is secured to the piston by bolt 67 and serves to seal-off the valve by closing the open region of base 62.

Forming the external surface of cage 59 is a screen 70 which acts as a filter, the tank's contents passing therethrough in flowing into and out of the tank. Cage 59 is secured to a step 18 in the base of tank 10 by screw engagement or other suitable means such as a flange arrangement.

To open valve 15, pressure is applied to actuator 30 causing piston 42 and rod 45 to move down. Rocker arm 31 thus rotates clockwise causing lift 22 and consequently piston 56 of valve 15, to move up. When the piston moves out of contact with the base 62 of valve cage 59 liquid is free to flow through screen 70 in a direction which depends on whether the tank is being loaded or discharged.

When pressure is removed from actuator 30 valve 15 is closed by virtue of the action of spring 50 which seats the piston 56 of the valve, one end of the spring applying a downward force to the yoke 55 connected to the piston. The spring 50, which is disposed on and coaxial with lift 22, has its other end abutting a collar 72 loose and coaxial with lift 22. The collar position is restrained by a semi-circular ring 76 having a lip 76' which seats on the collar. Ring 76 is integral with two vertical bonnets 74, the lower ends of which are integral with a semi-circular bonnet strap 75 disposed in a grooved recess in cage 59. For clamping the strap in this recess, a pair of arcuate clamps 78 are provided, each including an ear 78' which aligns with a corresponding ear 75' on strap 75. Each pair of ears is bolted together through the holes provided in the ears. The foregoing arrangement provides an improvement over means illustrated in applicant's aforementioned patent. Disassembly procedures have been considerably simplified with valve 15 being readily removable from the exterior of the tank shell without the need for entering the tank. Thus, rod 22 can be disengaged from lever 31 as described above and from the bonnet assembly 74 and the tank shell by slipping rod 22 laterally out of ring 76 after temporarily compressing collar 72 against spring 50. (In actual practice pivot 57 is orthogonal to the gap in 76 to facilitate this movement.) When rod 22 has been thus disengaged, it may be pulled up, carrying the valve head with it. Note that the valve head will clear the space between legs 74 in the lower region thereof. Hence the lift rod and valve head may be completely removed. All this can be accomplished from outside the tank through the inspection port (manhole) or via the opening formed when vent 21 is removed. A simple tool (not shown) adapted to precompress spring 50 facilitates these procedures.

In other respects the above-described combinations of actuator 30, rocker arm 31, lift rod 22 and internal valves 15 (or 16), are similar to the system described in applicant's aforesaid patent. The vent valve 21 is also similar to a vent valve, illustrated and described in applicant's U.S. Patent No. 2,821,991 issued February 4, 1958. As presently embodied the vent or relief valve comprises a valve head 80 and stem 81 attached thereto, the stem being slidably disposed in a central guide boss 82 concentric with the base of lower valve casing 83 and integral therewith by virtue of radial struts 84. Lower casing 83 includes threads 85 by means of which the casing is secured to shell 10. Secured to lower casing 83 is an upper casing 86, these components being joined by bolts and nuts 87 which join flanges of both casing sections.

For normal venting, upper casing 86 is equipped with ports 88. In the event of excess heat as when there is a fire, the upper casing is also supplied with a fusible blow-off disc 89 which separates from the casing thus permitting a vertical jet-like discharge of the tank's contents in a stream away from the tank shell 10. Such a high-velocity discharge is also promoted by the constricted configuration of the valve. In the event of ignition of the tank vapors, complete combustion thereof is insured by the presence of augmenting air drawing into the escaping stream through ports 88 under the influence of Bernoulli pressures associated with the issuing stream. For preventing back-burning, a screen 90 is included in the vent valve, being clamped between the upper and lower casings 83 and 86.

In operation, valve head 80 is urged into the closed (down) position by means of spring 60 one end of which engages valve stem 81 via a nut 90 and the other end of which is seated against the rim of boss 82. Either an excess pressure within the tank or a physical displacement of the valve caused by rocker arm 31 causes the valve to open against the action of spring 60. The former provides pressure relief when the internal tank pressure increases beyond a safe point. The latter provides the vacuum relief which is required when the tank valves are opened during unloading. Vacuum relief while the valves are closed is not provided in this arrangement. Its use in the tank of FIGURE 1 accordingly requires that the latter be equipped with separate vacuum relief vents.

While the valve as illustrated in the patent is without association with the above-described actuator and internal valve, such a use as generally illustrated in FIGURE 1 is known. This arrangement permits positive venting, i.e., the automatic opening of the vent when the internal valve is opened. Even with this known arrangement, however, a shortcoming exists in that the internal valve 15 or 16 opens to a substantial degree before the vent valve opens. This is due in part to the relative dimensions of the internal valve and the vent, these dimensions being fixed by other considerations. Thus, the designed travel of piston 56 of valve 15 from the full-closed to the full-opened positions may be 2½ inches in a typical installation while the maximum travel of the vent is ⅝ inch. (The lift rod in the known arrangement accommodates both movements by virtue of the clearance between the lift seat of rocker 31 and the stem of the vent valve when both valves are closed.) If the tank operator should fail to open fully the internal valve 15 or 16, specifically, if in this example, he opened it a distance of 1⅞ inches or less, then although this valve were open, the vent would be closed. Such an inadvertent action can at worst collapse the tank and at best it impedes the unloading operation. To prevent these results, applicant has provided an improvement which does not require any significant reworking of the known system and which is simply installed. It is also adjustable to permit adjustment of the relationships among the actuator, internal valve and vent.

To effect these objects a linkage is installed in combination with rocker arm 31 and its associated bracket 49 and includes a link 100 having at one end a yoke pivotably secured to bracket 49 by pin 101, and at the other end, a displaced foot 104 which seats on the pad 31' of rocker 31. Also provided is a second link formed of two segments 102a, 102b, the former being pivotably secured at its lower end to an intermediate point on rocker 31 by pin 103. Pin 103 is located slightly above the center line of the rocker. The yoke end of link 102b is pivotably secured by pin 105 to the bend in link 100.

If the path of foot 104 is traced as rocker 31 rotates, it may be observed that vent valve 21 opens simultaneously with internal valve 15 since the stem 81 of the vent valve is carried on foot 104 which moves when rocker 31 moves. The total movement of foot 104 is less than the movement of lift rod 22 (and therefore less than the movement of valve 15 connected thereto) because the foot is actuated from an intermediate eccentric point, rather than the end point, of rocker 31. Since the travel of foot 104 is less than that of valve 15 it accommodates the travel of vent valve head 80 which is, by design, less than that of valve 15. Accordingly, both valves are simultaneously actuated, they travel unequal distances and they reach their full-open positions substantially simultaneously. This arrangement alleviates the above-described shortcomings inherent in the prior arrangement. Moreover, precise coordination of the vent and internal valve is insured by the variable feature of the arrangement which enables adjustment of the overall length of the link formed by segments 102a and 102b. This is effected by disposing link 102b in a recess in the enlarged section of link 102a and providing a set screw 106 for locking the two links together after adjustment has been made. Also inhering in the above-described improvement is a safety feature involving the possibility of breakage of the mechanism involving linkage 100, 102a, 102b. In such event it is still possible to operate the vent valve as rocker 31 will ultimately contact the stem of the vent valve and open it.

The invention is not limited to specific combinations and improvements described herein but departures may be made therefrom within the scope of the accompanying claims without departing from the principles of the invention and without sacrificing its chief advantages.

What is claimed is:

1. In truck tank means, distributing means therefor comprising valve means connected to said tank means for controlling the flow of fluid therein, vent means on said tank means and control means for coordinately adjusting said vent means and said valve means comprising energizing means, first coupling means between said energizing means and said vent means for making said vent means responsive to said energizing means and second coupling means between said energizing means and said valve means, said second coupling means including first and second members rotatably joined by axially slidable pivot means, said pivot means including clamp means oriented eccentrically of the pivot axis for releasable clamping to said second member in one position of said pivot means, whereby said pivot means may be manually disengaged for separating said first and second members.

2. Apparatus according to claim 1 including discontinuous bearing means and in which said second member is coupled to said valve means and to said tank by said bearing means, and bearing means including an arcuate bearing member in sliding engagement with said second member and having a gap enabling disengagement of said second member from said bearing means.

3. In a truck tank valve system comprising valve means and valve actuating means, means for facilitating the disassembly of said valve and valve actuating means comprising a first member responsive to said actuating means, a second member coupled to said valve means for transmitting control operations thereto, coupling means between said first and second members, said coupling means including unkeyed pivot means having a clamp for releasably clamping said pivot means in one position thereof to one of said members, and bearing means coupling said second member to said tank and having a gap for disengaging said second member and said valve means from said tank.

4. A truck tank valve arrangement adapted to control the flow of fluid through a port in said truck tank comprising a valve head and steam means therefor, a plurality of parallel guides arranged in a configuration to form a guide for said valve head, said guides being oriented around the periphery of said port such that said valve head in one position is adapted to seal said port, spring means on said stem means one end of which engages said valve head, a plurality of legs extending longitudinally with respect to said stem means, said legs being coupled at one end to said guides, bearing means interconnecting the other end of said legs and juxtaposed relative to said stem means to engage the other end of said spring means, said bearing means being discontinuous so as to provide clearance for the lateral passage of said valve stem and said legs being spaced to provide clearance for the passage of said valve head therebetween.

5. A valve according to claim 4, in which said legs are clamped by straps to a ring integral with said guides.

6. A valve according to claim 4, in which said bearing means comprise lateral extensions integral with said legs.

7. A valve arrangement according to claim 4 including a fluid-operated valve actuator and a linkage interconnecting said actuator and said valve means, said linkage including a pivot and two linkage members rotatably interconnected by said pivot, said pivot including a clamp for clamping said pivot to one of said linkage members.

References Cited in the file of this patent

UNITED STATES PATENTS

| | | |
|---|---|---|
| 601,560 | Gallager | Mar. 29, 1898 |
| 710,849 | Dodd | Oct. 7, 1902 |
| 1,095,113 | Hrubesky | Apr. 28, 1914 |
| 2,212,370 | Jensen | Aug. 20, 1940 |
| 2,652,070 | Marx | Sept. 15, 1953 |
| 2,748,799 | Rath | June 5, 1956 |